O. D. PADRICK.
Revolving Harrow.
No. 56,088.
Patented July 3, 1866.
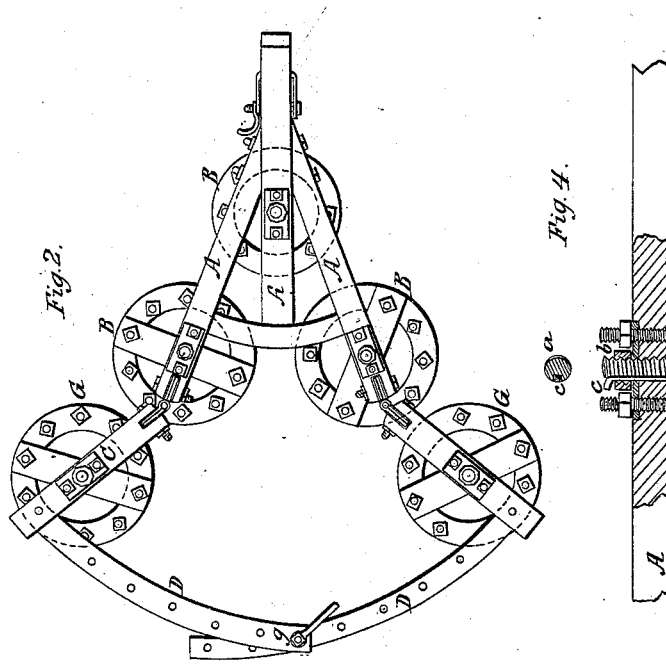
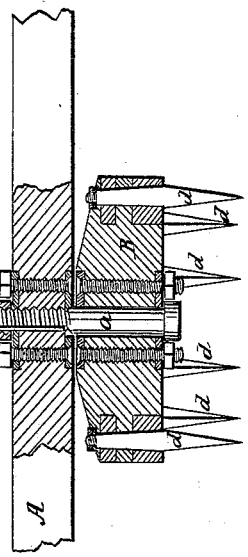
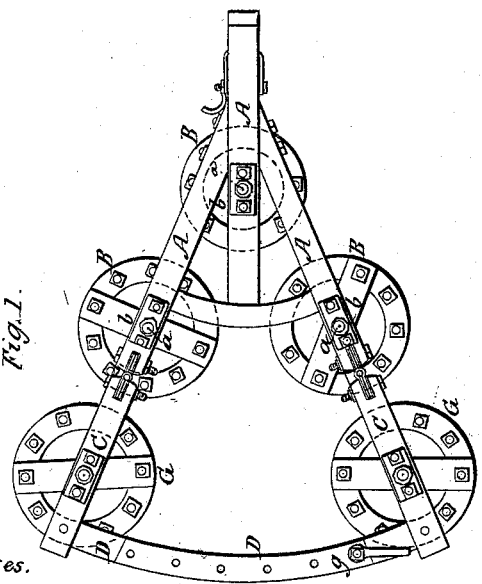
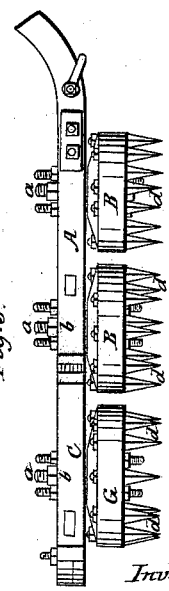
Witnesses.
R. T. Campbell.
Henry Sylvester.
Inventor.
Osca D. Padrick
by atty
Mason Fenwick & Lawrence

UNITED STATES PATENT OFFICE.

OSCAR D. PADRICK, OF SHELBYVILLE, INDIANA.

IMPROVEMENT IN HARROWS.

Specification forming part of Letters Patent No. 56,088, dated July 3,

*To all whom it may concern:*

Be it known that I, OSCAR D. PADRICK, of Shelbyville, in the county of Shelby and State of Indiana, have invented a new and Improved Harrow; and I do hereby declare that the following is a full, clear, and exact description thereof, reference being had to the accompanying drawings, making a part of this specification, in which—

Figure 1 is a plan view of the improved harrow. Fig. 2 is a plan view, showing the rear portion of the harrow extended. Fig. 3 is an elevation of one side of the harrow. Fig. 4 is an enlarged vertical sectional view, showing the manner of applying one of the rotary harrows to the frame.

Similar letters of reference indicate corresponding parts in the several figures.

This invention relates particularly to an improvement on that class of harrows in which a number of rotary harrows are pivoted to a triangular frame, so that as the frame is dragged over the land the small circular harrows will receive rotary motions, and thus thoroughly break up and pulverize clods of earth.

The nature of my invention consists in the application to a rigid triangular harrow-frame of two extensible wings, which are provided with circular harrows and connected together by extensible braces in such manner that the harrows can be increased or diminished in width and be braced in any desired position, as will be hereinafter described.

The rigid triangular frame A consists of two side bars, which are secured to a central bar that constitutes the draft-tongue and serves, in conjunction with a transverse brace, to strengthen and stiffen the side bars. To this triangular frame A three or more circular harrows, B B B, are pivoted by means of bolts *a a a*, which pass up through cross-beams of the circular harrows, and also through the side and central beams of the frame A, and receive on their upper ends nuts *b b b*.

The lower ends of the bolts *a* have heads formed on them, and the upper ends have longitudinal grooves cut in them for receiving keys *c*, that are driven into the slots after the nuts are adjusted in their proper places. These keys *c* are used for the purpose of preventing the nuts *b* from turning and working loose.

Washer-plates are applied to the harrows B and the frame A, so as to protect from rapid wear those parts which abut against each other, as shown in the sectional view, Fig. 4.

The circular rotating harrows are provided with spikes *d d d*, which are constructed so as to taper from the middle of their length toward the ends. Each one of these teeth has a screw-thread formed on one end for receiving a nut for drawing the tooth firmly into a tapering hole which is made through the circular rim of the harrow, and thus securing the tooth rigidly in place.

To the rear extremities of the side beams of frame A, I hinge or pivot two beams, C C, which have segments D D secured to their rear extremities and projecting inward, so as to lap on each other and serve, when united together, as lateral braces for sustaining the extensions C C in any desired position. These segments or extension-braces D D are perforated at several points for admitting the bolt *g* when the beams C C are adjusted in the position desired. To these extensions C C, I apply circular harrows G G, by means of center bolts or pivots, substantially as described for the corresponding harrows which are attached to the frame A.

Several bolts, *g*, may be applied to the extension-braces D D for securing them together and holding the hinged beams or wings C C in place when properly adjusted.

By my invention I combine with a rigid angular harrow-frame a laterally adjustable and extensible harrow-frame, by which means the harrow can be increased or diminished in width at pleasure without affecting its lateral strengthening-brace or adjusting the forward triangular frame.

Having thus described my invention, what I claim as new, and desire to secure by Letters Patent, is—

The application of hinged harrow-carrying arms C C to a rigid triangular harrow-frame, A, in combination with the extensible braces D D, which are provided with means for fastening them together, substantially as described.

OSCAR D. PADRICK.

Witnesses:
EDWD. H. DAVIS,
CYRUS WRIGHT.